March 5, 1929.  J. J. DANIELS  1,703,990
TRAP FOR ANIMALS
Filed April 28, 1927
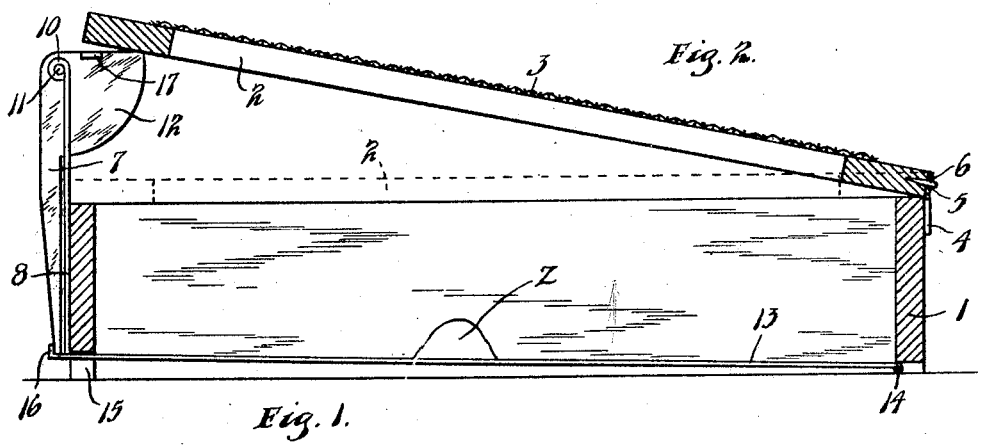
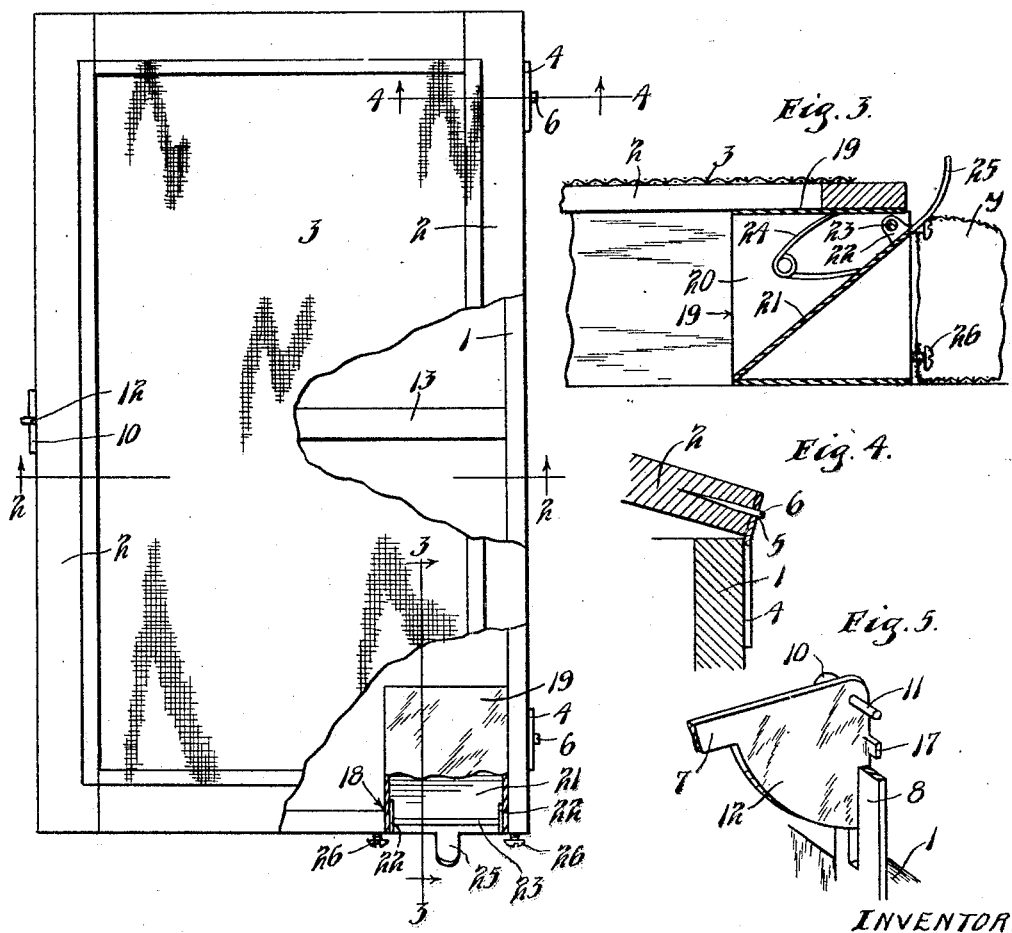
INVENTOR.
JOHN J. DANIELS.
BY HIS ATTORNEYS.
Williamson Reiff Williamson Patented Mar. 5, 1929.

1,703,990

UNITED STATES PATENT OFFICE.

JOHN J. DANIELS, OF WILLMAR, MINNESOTA.

TRAP FOR ANIMALS.

Application filed April 28, 1927. Serial No. 187,219.

My invention has for its object to provide an improved animal trap and, to this end, the invention consists of the novel devices and combinations of devices, hereinafter described and defined in the claims.

The invention is illustrated in the accompanying drawings, wherein like characters indicate like parts throughout the several views.

Referring to the drawings,

Fig. 1 is a plan view of the improved animal trap, some parts being broken away and some of the exposed parts being shown in section;

Fig. 2 is a transverse vertical section, taken on the line $x^2$ $x^2$ of Fig. 1 on an enlarged scale;

Fig. 3 is a detail view, in vertical section, taken on the line $x^3$ $x^3$ of Fig. 1 on an enlarged scale;

Fig. 4 is a detail view, in vertical section, taken on the line $x^4$ $x^4$ of Fig. 1 on an enlarged scale; and Fig. 5 is a perspective view of the trigger in a trip position, some parts being broken away.

The numeral 1 indicates the sides and ends of an open bottom rectangular wooden box, having a movable cover 2, comprising a rectangular marginal frame, provided with a panel 3 of reticulate material, such as woven wire screen. The cover 2 is movably and detachably secured to the box 1 by pieces of flat spring metal, constituting hinge straps 4. At their lower ends, these hinge straps 4 are permanently secured to one of the sides of the box 1 by screws or other suitable means, and their upper end portions project above the upper edge of the box 1 and are each provided with a central perforation 5. For detachably securing the hinge strap 4 to the cover 2, a pair of sharp pointed studs or headless nails 6 are driven partly into one of the side edges of the rectangular cover frame 2, with their projecting ends arranged to extend through the perforations 5 in the hinge straps 4. Obviously, when the cover 2 is raised, the studs are cramped in the openings 5 and thereby held against endwise removal therefrom.

For holding the trap set, or, in other words, for holding the cover 2 open in order to permit an animal to pass into the box 1, when a bait is set, a normally depending trigger lever 7 is pivotally mounted on a supporting bar 8 secured to the front of the box 1. At its upper end, this supporting bar 8 is bifurcated to receive the trigger lever 7, and the prongs thereof terminate in a pair of aligned seats or bearings 10, in which is loosely journaled the ends of a horizontally extended pivot pin 11. This pivot pin projects through the upper end portion of the trigger lever 7 and its intermediate portion is rigidly secured thereto. Integrally formed with the upper end portion of the trigger lever 7 is a laterally projecting segmental trigger head 12, of such size as to project under the front edge portion of the cover 2, and support the same in an elevated or open position, as shown in Fig. 2.

For holding the trigger lever 7 in an operative or set position, a trigger lock bar 13 is provided, which extends horizontally and transversely across the box 1. One end of this trigger lock bar 13 is secured to the side of the box 1, to which the hinge straps 4 are also secured by a hinge element 14. The other, or free end of the trigger lock bar 13, projects through a small opening 15, formed in the front side of the box 1, and terminates in an upwardly projecting detent 16, adapted to engage and frictionally hold the depending end of the trigger lock bar 13. When the trap is set, the weight of the cover 2 on the trigger head 12 tends to throw the free or depending end of the trigger 7 up, but is prevented from doing so by the engagement of the lock detent 16 therewith. This frictional engagement of the lock detent with the trigger lever 7 also holds the free end of the trigger lock bar 13 in a slightly elevated position, as shown in Fig. 2.

The bait Z indicated in Figs. 1 and 2, may be secured to the trigger lock bar 13 by tying the same thereon with a fine wire or string, or the trigger lock bar 13 may be provided with a barb, not shown, onto which the bait Z is pressed.

The trap is sprung by the animal within the box, either by stepping directly on the trigger lock bar 13 or by pulling on the bait Z, as it takes very little movement of the trigger lock bar 13 to release its detent 16 from the trigger lever 7. As soon as the trigger lever 7 is released, the weight of the cover 2, combined with the action of the spring trap hinges 4, swings the trigger head 12 into a position to permit the cover 2 to close. As soon as the cover 2 is closed, the trigger lever 7 and trigger head 12 return to normal position under the action of gravity. Upon the return of the said parts to their normal positions, the cam head 12 passes over the cover 2, and thereby forms a lock to prevent the animal from lifting the cover 2 and, thereby, escape from the trap. To prevent the cam head 12 from moving too far at the time the trap is sprung, the same is provided with a laterally projecting lug 17, which engages one of the prongs 8 and thereby limits the swinging movement of the said head.

I have found that, when rats are killed in the traps in which they have been caught, other rats will not, as a rule, enter the same traps, thereby destroying their value. To remove an animal alive from my improved trap, the box 1 is provided, at one end, with an opening 18, into which is fitted a rectangular metal casing 19, having open ends to form a passage way 20, leading through one end of the box 1. This passage way 20 is normally closed by a door 21, having at its upper corners a pair of laterally spaced hinge lugs 22, through which is passed a hinge rod 23, secured, at its ends, to the sides of the casing 19. The length of the door 21 is considerably greater than the height of the passage way 20, and normally projects obliquely from the upper outer edge of the casing 19 to the lower edge thereof. A butterfly spring 24 yieldingly holds the door 21 closed. Evidently, a door constructed and arranged as the door 21 cannot be opened by pressure from within the trap. At its upper end, the door 21 terminates in a finger piece 25, projecting completely outside of the passage way 20.

To remove the animal alive from my improved trap, the mouth of a bag Y is secured around the outer end of the passage way 20 by means of tacks 26 or other suitable means, driven into the box 1. After the passage way 20 has been completely closed by the bag Y, the door 21 is opened by pressing downward on the finger piece 25 and the animal is driven into the passage way 20 into the bag Y. The mouth of the bag Y is then closed and removed from the trap. The animal within the bag Y may be disposed of by drowning, or otherwise.

The above described trap, while extremely simple, being composed of few parts, which may be very easily taken apart and cleansed, and of small cost to manufacture, is thought to be highly efficient for the purpose had in view.

What I claim is:

1. An animal trap comprising a cage having a gravity closed hinged cover, a depending trigger lever pivotally connected, at its upper end, to said cage and having a head extension, a lock arranged to be tripped by an animal within said cage and having a detent engageable with said trigger lever, said head arranged to support said cover in an open position, when said trigger lever is set, the weight of said cover on said head tending to hold the free end of said trigger lever engaged with said detent, said cover moving said head into an inoperative position to permit said cover to close when said trigger lever is tripped, and said head returning to normal position over said cover, under the action of gravity, thereby holding the same closed, substantially as described.

2. An animal trap comprising a cage having a gravity closed hinged cover, a depending trigger lever pivotally connected, at its upper end, to said cage and having a head extension, a lock bar extending through said cage, one end of said lock bar being connected by a hinged joint to said cage and its other end having a detent engageable with the free end of said trigger lever, said head arranged to support said cover in an open position, when said trigger lever is set, the weight of said cover on said head tending to hold the free end of said trigger lever engaged with said detent, said cover moving said head into an inoperative position, to permit said cover to close when said trigger lever is tripped, and said head returning to normal position over said cover under the action of gravity, thereby holding the same closed, substantially as described.

3. In an animal trap, an enclosure or pen having a cover hingedly connected thereto, a swingable trigger member for supporting said cover in raised position, said trigger member being supported from said enclosure adjacent the free edge of said cover, a latch member adapted to be released by an animal within said enclosure and adapted to retain said trigger member when the weight of said cover is placed on said trigger member, said trigger member having a locking portion disposed at a height above said enclosure and adapted to be outwardly moved when said latch member is released and to thereafter swing inwardly above said cover to lock the same in closed position.

4. In an animal trap, an enclosure or pen having a cover hinged thereto on a horizontal axis, a support carried by said enclosure adjacent the free end of said cover and having a horizontal bearing therein, a trigger member pivoted in said bearing and having a depending arm and an inwardly projecting locking head above said enclosure on which said cover may be supported when the trap is set, a latch member adapted to retain the depending portion of said trigger member when the weight of said cover is placed upon said locking head, means for returning said locking head to normal position after said latch member is released and said cover has closed, and means for limiting the inward swinging movement of said trigger member.

In testimony whereof I affix my signature.

JOHN J. DANIELS.